(12) United States Patent
Wu et al.

(10) Patent No.: US 8,051,145 B2
(45) Date of Patent: Nov. 1, 2011

(54) METHOD OF SIMULTANEOUSLY PROVIDING DATA TO TWO OR MORE DEVICES ON THE SAME NETWORK

(75) Inventors: Kang Heng Wu, Guangdong (CN); Kar-Wing Edward Lor, Hong Kong (CN); Soung Liew, Hong Kong (CN)

(73) Assignee: Hong Kong Applied Science and Technology Research Institute Company Limited, Shatin, New Territories (HK)

( * ) Notice: Subject to any disclaimer, the term of this patent is extended or adjusted under 35 U.S.C. 154(b) by 389 days.

(21) Appl. No.: 11/731,401

(22) Filed: Mar. 30, 2007

(65) Prior Publication Data

US 2008/0243996 A1 Oct. 2, 2008

(51) Int. Cl.
*G06F 15/16* (2006.01)
(52) U.S. Cl. ......... 709/219; 709/201; 709/203; 709/204
(58) Field of Classification Search .................. 709/219, 709/201, 203; 364/200
See application file for complete search history.

(56) References Cited

U.S. PATENT DOCUMENTS

| | | | | |
|---|---|---|---|---|
| 4,519,029 | A * | 5/1985 | Thompson | ..................... 709/227 |
| 6,999,988 | B2 | 2/2006 | Buddhikot et al. | |
| 7,076,544 | B2 | 7/2006 | Katz et al. | |
| 7,099,953 | B2 | 8/2006 | Horiuchi et al. | |
| 2002/0007404 | A1 * | 1/2002 | Vange et al. | ................... 709/217 |
| 2002/0103972 | A1 | 8/2002 | Satran et al. | |
| 2002/0176418 | A1 | 11/2002 | Hunt et al. | |
| 2003/0014603 | A1 * | 1/2003 | Sasaki et al. | ................... 711/158 |
| 2003/0018769 | A1 * | 1/2003 | Foulger et al. | ................. 709/223 |
| 2003/0110296 | A1 * | 6/2003 | Kirsch et al. | ................... 709/246 |
| 2003/0149720 | A1 * | 8/2003 | Goldstein | ..................... 709/202 |
| 2003/0174648 | A1 | 9/2003 | Wang et al. | |
| 2004/0003101 | A1 | 1/2004 | Roth et al. | |
| 2004/0249965 | A1 | 12/2004 | Huggins et al. | |
| 2006/0059223 | A1 * | 3/2006 | Klemets et al. | ............... 709/200 |
| 2006/0064500 | A1 | 3/2006 | Roth et al. | |
| 2006/0259637 | A1 | 11/2006 | Yadav et al. | |
| 2006/0281218 | A1 | 12/2006 | Chen | |
| 2008/0010410 | A1 * | 1/2008 | Zilbershtein et al. | .......... 711/118 |
| 2008/0159289 | A1 * | 7/2008 | Narayanan et al. | ............ 370/392 |
| 2008/0270520 | A1 * | 10/2008 | Reid et al. | ..................... 709/203 |

* cited by examiner

*Primary Examiner* — Ian N Moore
*Assistant Examiner* — Khaled Kassim
(74) *Attorney, Agent, or Firm* — Wells St. John P.S.

(57) ABSTRACT

A method of providing data to two client devices on a first network having a shared cache from a server device on a second network. An instance of substantially simultaneous requests for data being made to a server from two client devices on a same network is identified. In response to a first request for the data being received at a first point in time a first one of the two client devices is served with the requested data from the server such that the data is stored in the shared cache. The second one of the two client devices is directed to make a second request for the data at a second point in time, later than the first point in time, so that the requested data is available in the stored cache.

13 Claims, 7 Drawing Sheets

METHOD OF SIMULTANEOUSLY PROVIDING DATA TO TWO OR MORE DEVICES ON THE SAME NETWORK

BACKGROUND TO THE INVENTION

1. Field of the Invention

The current invention relates to a method of providing data to two or more devices on the same network from a server or another computer on a second network. More particularly, the invention relates to a method of simultaneously streaming media content to two or more client device on the same network.

2. Background Information

When two or more devices, for example computers, on the same network request a data resource (for example a file, web page or streaming media content) from another computer or server on another network there is a waste of network bandwidth if duplicate copies of the requested data resource are sent from the second network to the first network. To avoid this many networks have a proxy server or caching server that provides a shared cache for client computers on a network. When a resource is requested by a computer on a first network from a server or computer on a second network, the resource is served to the requesting computer and is stored in a cache on the network of the requesting computer. Thereafter, if another computer of the first network makes a duplicate request for the same data resource it can be served directly from the cache without transferring the request to the original data resource provider on the second network. This reduces internet gateway bandwidth requirements and speeds up resource access time for client computers on the first network.

A problem exists with the above-mentioned scheme if two or more original requests for the same data resource are initiated simultaneously from two or more client computers on the same network. If the data resource has not been previously stored in the shared cache then both requests will be sent to the original data resource server. This problem is particularly significant in the case of streaming live media content, such as video or audio programs, over the internet. Because the live content is streamed in real-time there is no, or very little, opportunity for the content to be cached before multiple requests are made and send from a first network. This can be particularly problematic for internet service providers (ISP) who provide internet access to individual consumers and often have a very large number of clients computers connected simultaneously to its internet access network. When popular live events such as sporting fixtures are streamed live on the internet a significant number of requests for the streaming content can originate from a single ISP network.

Accordingly, it is an object of the present invention to provide a method for providing data resources, and in particular streaming media content, to two or more client computers on a same network which ameliorates or substantially overcomes the above-mentioned problem. It is a further object to a present invention to provide a method of simultaneously streaming live video and audio content over the internet to two or more client computers on the same network which takes advantage of existing shared caching services of the network.

SUMMARY OF THE INVENTION

There is disclosed herein a method for providing data to two client devices on a first network from a server device on a second network, said first network including a shared cache for caching data requested by the client devices, the method comprising identifying an instance of substantially simultaneous requests for data being made to a server from two client devices on a same network. in response to a first request for the data being received from a first one of the two client devices at a first point in time, serving the first client device with the requested data from the server such that the data is stored in the shared cache on the first network, and directing that a second one of the two client devices make a second request for the data at a second point in time, wherein the second point in time is later than the first point in time so that the requested data is available in the stored cache.

Preferably, directing that the second client device make a second request for the data at a second point in time comprises running on the second client device a program that interrupts the second request for the data and sends the second request after a delay.

Preferably, the delay is a random delay or a fixed delay is determined by the server device or one or more of the client devices.

Preferably, directing that the second client device make a second request for the data at a second point in time comprises receiving at the server a request for the data from the second client device and sending a message from the server to the second client device instructing the second client device to send the second request after a delay.

Preferably, the method is used for streaming media content to two client devices on a first network from a media server on a second network, comprising identifying an instance of substantially simultaneous requests for streaming media content being made to a media server from two client devices on a same network, in response to a first request for the streaming media content being received from a first one of the two or more client devices at a first point in time, serving the first client device with the requested media content from the media server such that the media content is stored in the shared cache, and directing that a second one of the two or more client devices make a second request for the streaming media content at a second point in time, wherein the second point in time is later than the first point in time such that the media content is served from the cache.

Preferably, serving the first client device with the requested media content comprises serving a segment of the requested media content as a cacheable web page.

Preferably, the first network comprises a local area network and the media server is on the Internet.

Preferably, identifying an instance of substantially simultaneous requests for streaming media content being made to a media server comprises passing said requests to the media server and, in the media server, identifying that the requests originate from the same network.

Preferably, the method further comprises, in the media server, tracing the route of the requests for the streaming media content and thereby identifying the originating network, and directing that a second one of the two client devices make a second request for the streaming media content at a second point in time only if the requests originate from the same network, otherwise serving the second client device with the requested content.

Preferably, identifying an instance of substantially simultaneous requests for streaming media content being made to a media server comprises, in the media server, pre-registering the first and second client devices, and during the pre-registering step, tracing the route of registration requests made from the first and the second client devices and thereby identifying the originating network.

Preferably, the method further comprises providing on the first and second client devices software modules that direct requests for streaming media content directed to the media server, the software modules directing that the first client device requests the streaming media content at a first point in time, and directing that the second client devices requests the streaming media content at a second point in time, wherein the second point in time is later than the first point in time.

Preferably, directing that the second client device make a second request for the media content at a second point in time comprises running on the second client device a device program that directs the second device to send the second request after a delay.

Preferably, directing that the second client device make a second request for the media content at a second point in time comprises receiving at the server a request for the media content from the second client device and sending a message from the server to the second client device instructing the second client device to send the second request after a delay.

Preferably, the method is used for providing data substantially simultaneously to two client devices connected to the same network, comprising receiving a first request for data from a first client device on a network, receiving a second request for the data from a second client device on the network, serving the first client device with the requested data such that the content is cached by the caching server, and sending a message to the second client device instructing the second client device to send another request for the data after a delay, thereby allowing the second client device to be served with the requested media content by the caching server.

BRIEF DESCRIPTION OF THE DRAWINGS

The invention will now be described with reference to the accompanying drawings in which.

DETAILED DESCRIPTION OF THE EXEMPLARY EMBODIMENTS

Figure 1:
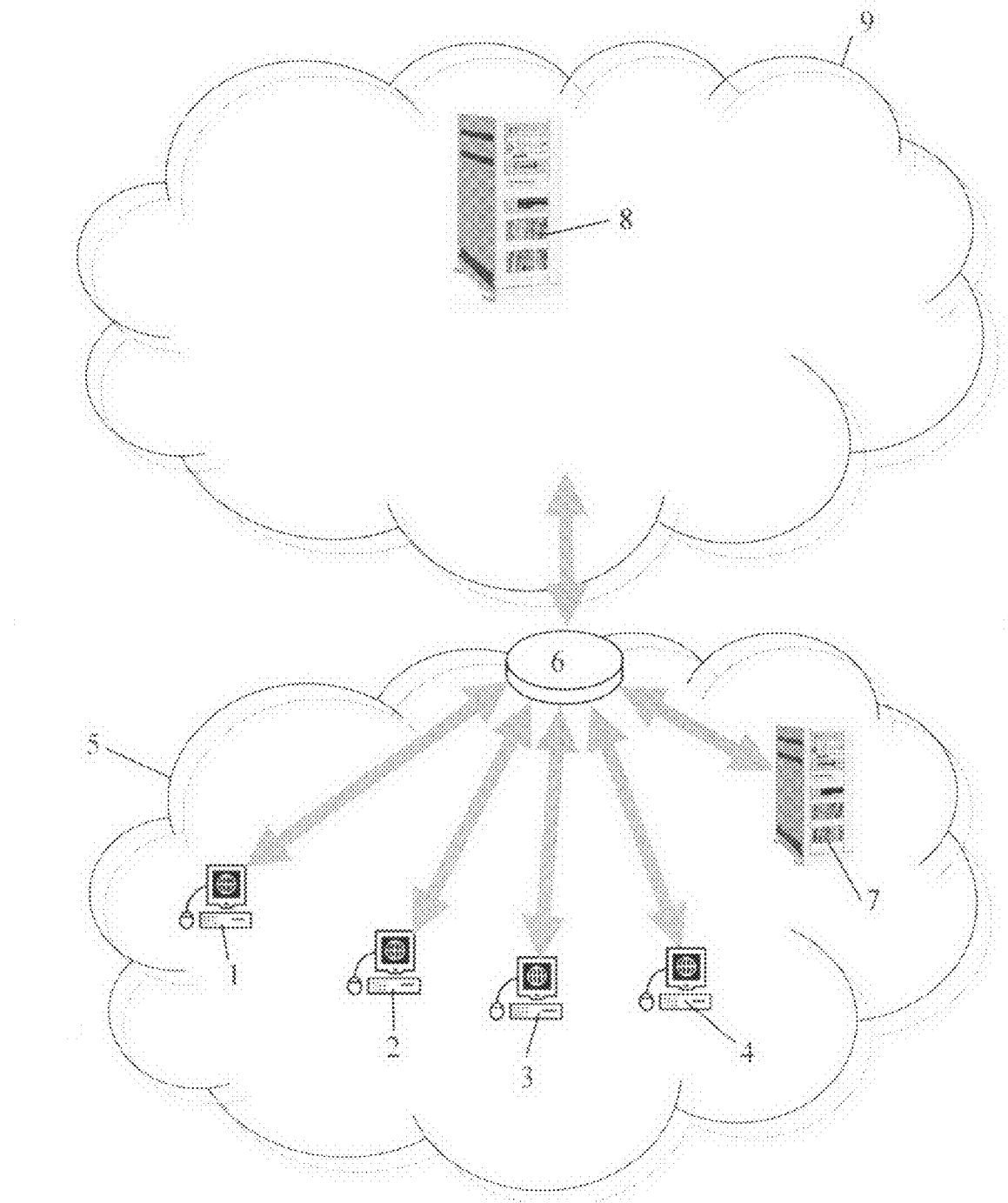
FIG. 1 is a schematic overview of an environment in which the exemplary embodiment of the invention is practiced.

Referring to FIG. 1, exemplary embodiments of the invention will be described as practiced in a computing environment comprising a plurality of remotely located computers 1, 2, 3, 4 that access the internet and related services via the same internet service provider (ISP) network 5. The computers 1, 2, 3, 4 connect to the ISP internet access network 5 using dial-up, DSL (typically ADSL), broadband wireless access, cable modem, ISDN or similar means. The ISP network 5 has a router 6 one or more proxy servers 7 that provides a service to allow the computers 1, 2, 3, 4 to indirectly connect to other computers or servers 8 on the internet 9. The proxy server also comprises a shared cache for the client computers 1, 2, 3, 4. However, this is not intended to limit the scope of use or functionality of the invention. The skilled addressee will appreciate that the invention can be applied to any network that connects together a plurality of devices that access remote data resources and which has a caching server or shared cache for temporarily storing requested data resources to reduce bandwidth requirements of the network gateway and speed up resource access times for the client's computers. Such a network may be a company, organization or private local area network (LAN) or wide area network (WAN) where the devices may be in geographically close proximity or geographically different and remote locations. In particular, the current invention might be particularly useful in a global organization having a plurality of interconnected regional networks in which two or more computers on one regional network might simultaneously access information or data resources on another regional network. For example, the current invention would find useful application in streaming videoconferences, teleconferences or live presentations to the desktops of employees of an organization have offices at various geographically remote locations. The invention might also be useful in a television broadcast applications where the clients devices comprises set-top boxes for accessing streaming video resources from other networks, or in mobile networking applications where the client devices are mobile handsets.

The invention will also be described as practiced in a media streaming situation, for example, where a plurality of client computers may choose to simultaneously access live streaming media from a streaming server. However, this is also not intended to limit the scope of use or functionality of the invention. The skilled addressee will appreciate that the invention might also find application in any network application where two or more computers may simultaneously request data resources from another computer or server on a different network or even on subnets of the same LAN or WAN.

In the following discussion the term proxy server refers to a network computer that provides a service to allow other computers or devices in the network to indirectly connect to computers or servers in another network. Typically, but not essentially, the proxy server and client computer are on a local area network or Internet access network and the other computer or server is on the Internet. Computers on the network send a request for a resource available on the other computer or server to the proxy server, which provides the resource either by passing the request to the other computer or server or by retrieving the resource from a shared cache. In situations where a plurality of client computers typically access internet recourses through a company, organization or ISP network, the network often has such a proxy server to enforce network use policies, to provide security and to provide a shared cache to the client computers. For the purpose of describing the current invention will ignore the former uses and assume that purpose of a proxy server is to provide a shared cache to the client computers. This helps reduce the network's internet gateway bandwidth requirements and speeds up resource access times for the client computers. Again, this is not intended to limited the scope of use or functionality of the invention and a shared cache can be provided by a dedicated network cache or cache server connected to the router 6 using Web Cache Communication Protocol (WCCP) developed by Cisco Systems.

Figure 2:
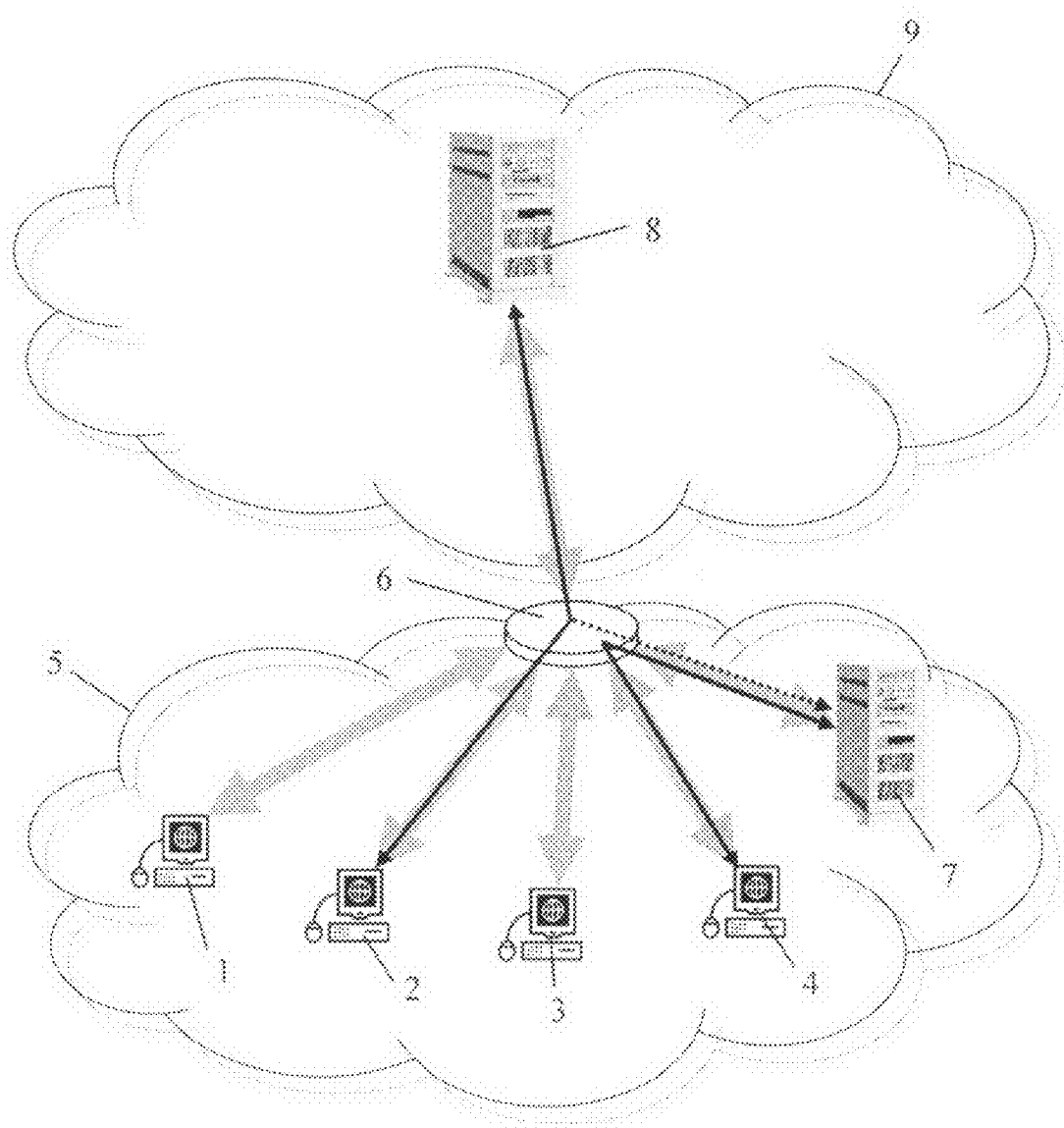
FIG. 2 is a schematic overview of a first preferred embodiment of the invention.

Referring to FIG. 2, in a first exemplified embodiment of the invention the plurality of client computers 1, 2, 3, 4 are connected to an ISP broadband access network 5 via known means such as DSL or cable modem. The broadband access network 5 provides internet access to the client computers 1, 2, 3, 4 via a router 6 and proxy server 7 which has a shared cache for temporarily storing internet data resources requested by computers 1, 2, 3, 4 connected to the broadband access network 5. At a remote location on the internet 9 is a streaming server 8 that provides live streaming media content such as videos of sporting events. The streaming server 8 streams the media content to client computers connected to the internet in real time. In order to take advantage of the shared caching service of the proxy server 7 the streaming server 8 delivers the media content by packaging short segments of the content as web pages for transfer via the internet to the client computers. These web pages will be cached by the proxy server 7 so that they are available within the ISP access network 5 for any further client computers that may request the same content. This not only reduces traffic on the ISPs internet gateway but also reduces the number of streaming hits received by the streaming server 8. The streaming media content is packaged as web pages by the streaming server 8. The streaming server 8 breaks the video clip, or other resource, into a series of segments and constructs a HTTP data message from the individual segments. The HTTP data messages are then sent to the client device in response to a series of HTTP requests. Within the client device the HTTP data messages are deconstructed and the segments of the video clip reconstructed. Reconstruction can be by repackaging the segments as RTP packets and streaming the packets locally on the client computer to the media player.

If cacheable streaming content has not been previously requested by and served to a client computer on the ISP network it will not be stored in the shared cache of the network. If two or more client computers on the network were to make simultaneous requests to the streaming server for the content, which is highly probably in the case of streamed live events, then the proxy server will pass both requests to the streaming server. To avoid this situation the requests for streaming content from two or more client computers are staggered in time so that a first client computer is served with the streaming content from the streaming server before subsequent requests are received by the proxy server of the network. On receipt of the subsequent requests the proxy server will find the requested content stored in the shared cache and can serve the subsequent requests directly from the cache. This is achieved by causing some or all client computers on the network to delay or resend requests for the resource.

According to a preferred embodiment of the invention each client computer on a network wishing to access the streaming content must first download and install a client application, or add-in, to its web browser application. The client application operates to introduce a random time delay to all streaming requests initiated by the client computers 1, 2, 3, 4 and directed at the streaming server 8. When the user of each client computer visits the streaming server 8 via a web browsing application and initiates the streaming video connection, the client application is downloaded and installed, if it is not already installed. The media player application on which the user is viewing the streaming video service initiates requests for streaming content in accordance with known streaming protocols, such as RTSP. This request is interrupted by the client application which introduces a delay before forwarding a HTTP data message request to the streaming server 8. In the preferred embodiment the delay is between zero and sixty (60) seconds depending on such factors as the length of the buffer in the media player and the number of clients involved. Because the delay generated by the client application is random there is a low probability of two client computers on the same network making simultaneous requests for the same streaming data. After a first HTTP request is sent from one of the client computers and served by the streaming server the requested streaming data is stored in the network shared cache and will be available when subsequent requests are made. This is illustrated in FIG. 2. Assuming client computer 2 has a shorter random delay that client computer 4 the first request is passed to the server 8 which serves the requested content to computer 2 as a cacheable web page so that a copy is also stored in the shared cache. When client computer 4 makes its request later than computer 2 the requested content is found in the shared cache and computer 4 is served by the proxy server 7 from the cache.

There still exists a possibility with the above-mentioned embodiment that two or more client computers having a random delay generated by the client application will make data requests sufficiently close to each other that the first request is not served and cached before the second request is made. Thus, to ameliorate this problem, in an alternative embodiment the streaming server assigns the client application a fixed delay time when the user visits the streaming server website to download the client application in preparation for viewing the streaming media content. The streaming server 8 assigns a different fixed delay to each client application that is downloaded to different client computers on the same network 5 so that no two client computers 1, 2, 3, 4 on the same network 5 can make substantially simultaneous data requests to the streaming server 8.

Alternatively, and in a third embodiment of the invention, the client application of each client computer 1, 2, 3, 4 identifies and registers each other client computer on the network 5 that will access the streaming media content on the streaming server 8 and via pair-to-pair coordination ensure that no two client computers 1, 2, 3, 4 make simultaneous requests for the streaming content from the streaming server 8. One method of achieving this is to use a token passing scheme whereby a client application only forwards data requests if it has the token. After forwarding a data request the client application passes the token to another client computer so that its client application may forward a content request.

In the above mentioned embodiments a delay is introduced so that no two client computers 1, 2, 3, 4 make simultaneous or near simultaneous requests to the server 8 for the same streaming content. It will have become apparent that it is only necessary to delay the second request for the streaming content as after the first request is served the requested content will be cached and subsequent requests for the content need not be controlled. Accordingly, in another method of pair-to-pair coordination one client computer is designated as a 'seed' or first requester. The seed computer makes the first request of the streaming server which results in caching of the requested content and after a short delay all other client computers are free to make requests for the same content. However, if the client computer that is designated as the seed ends the streaming session then the system will breakdown unless there is some coordination between the remaining client computers as to which becomes the next seed computer. Therefore, while it is strictly not necessary for proper operation of the invention it is desirable that the system coordinates requests from all client computers so that no two client computers 1, 2, 3, 4 make simultaneous or near simultaneous requests to the server 8 for the same streaming content, thus allowing any one client computer can end its streaming session without the system of the invention failing. Another way to ameliorate this problem is to combine the seed scheme with a token passing scheme, wherein the seed computer is the one with the token and the token is passed to another client computer after a request for a segment of the streaming content is made. The next client computer to receive the token becomes the seed computer for the next requested segment of the streaming content.

Figure 3:
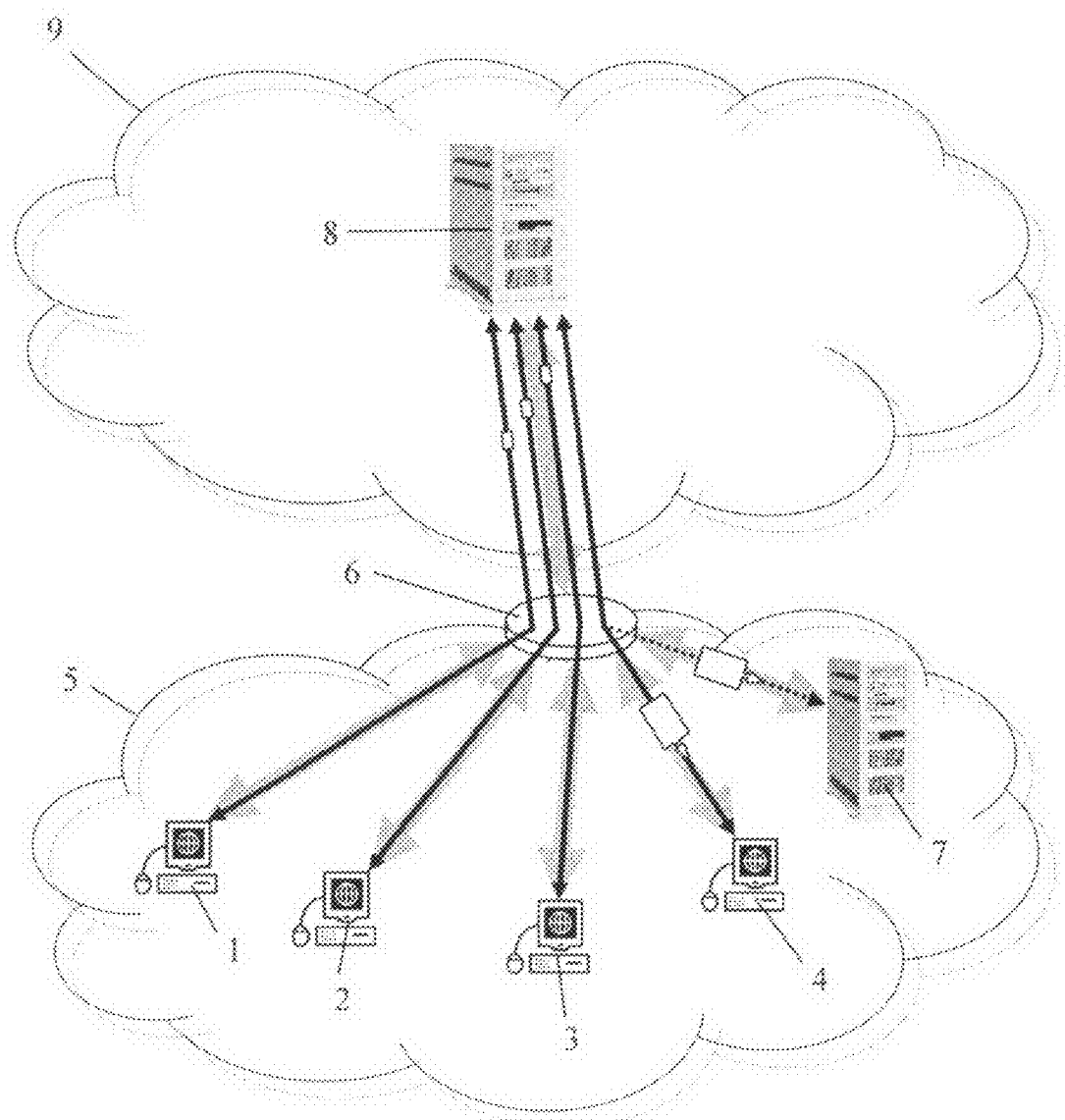
FIG. 3 is a schematic overview of a second preferred embodiment of the invention.

The above mentioned embodiments all represent client based methods in which there still exists potential problems of client computers entering and or leave the live streaming feed part way through. Therefore, in yet a further embodiment of the invention the server handles simultaneous requests from clients. If simultaneous or near simultaneous content requests are made and the content is not yet stored in the network shared cache the proxy server will passes all requests to the streaming server. If such multiple requests are received from the same network the streaming server serves one of the clients with the requested content and sends a message to the second and any subsequent clients instructing them to wait for a delay, of say 5-60 seconds, and resend the request for the content. Again, the factors determining the amount of delay include, but are not limited to, the buffer length of the media player and the number of clients involved. At the end of the delay when the request is resent the requested content will probably be cached in the network shared cache and the second and subsequent clients can be served from the cache by the proxy server. This is illustrated in FIG. 3. All four client computers 1, 2, 3, 4 send near simultaneous content requests to the server 8. Because the content has not previously been served to a computer in the network 5 all four requests are passed to the streaming server 8. The server serves one computer, say computer 4, with the requested content 10, and a copy is stored in the proxy cache 7. The server sends the remaining computers 2, 3, 4 messages 12, 13, 14 with instructions to wait for a short delay and resend the content requests. When the client computers 2, 3, 4 resend the requests the requested content is found in the shared cache and the computers are served by the proxy server 7 from the cache.

One important consideration in many of the above embodiments is identifying that two or more client computers that will or have made simultaneous request for live streaming content are on the same network. This can be done in the streaming server by tracing the route of requests from the client computers or in the by client application applications by probing the network at the beginning of a streaming session. One option that is preferred by the inventors is to identify client computers on the same network at a pre-registration stage. In order to receive streaming media content from the streaming server users must register to receive the content from the client computer they intend to user to view the content. During this pre-registration the server traces the route of each client computer to find the client computer's IP address and identify whether two or more clients on the same network. The streaming server then makes available the client application for downloading and installing in the client computer web browser or records the client computer identification in a look-up table to identify when simultaneous requests are received from two or more clients from the same network.

Figure 4:
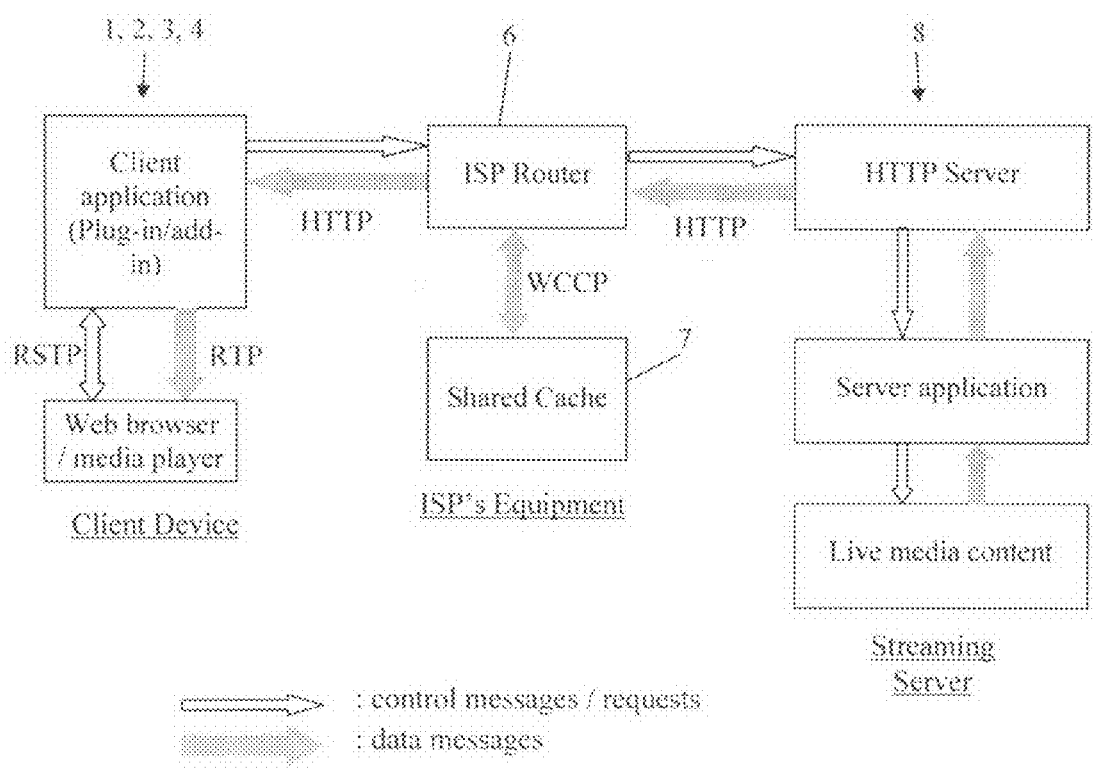
FIG. 4 is a schematic illustration of the software and communication architecture for the preferred embodiments.

The above discussion describes various applications and methods that are carried out by software applications and/or computers in networking and/or internet environments. The programming and implementation of such applications and methods in the client or server computers is well within the skill and capabilities of one skilled in such arts. FIG. 4 illustrates the architecture of the exemplary embodiments. The client computers 1, 2, 3, 4 have the client application interface to the web browser or media player on which the content is being viewed. The web browser/media player sends RTSP messages to set up local streaming and receives RTP data packets back from the client application, which are the actual media. The client application intercepts the web browser/media player RTSP messages and sends and receives Hypertext Transfer Protocol (HTTP) messages and data packets to and from the streaming server 8. In the client orientate solution the client application introduces a random or server set delay before sending content requests, or coordinates requests with its pair client applications on other client computers in the network. The streaming server 8 has a server application that receives the requests from an HTTP server of the streaming server 8 and packages segments of the streaming content as cacheable HTTP packets that it passes to the HTTP server for responding to the client computer request. In the server orientated solution, the server application also checks for multiple request from the same network and passes the HTTP server a "delay and resend" message if the segment of requested media content has already been sent to the same network. The server application also handles the pre-registration and route tracing functions.

Figure 5:
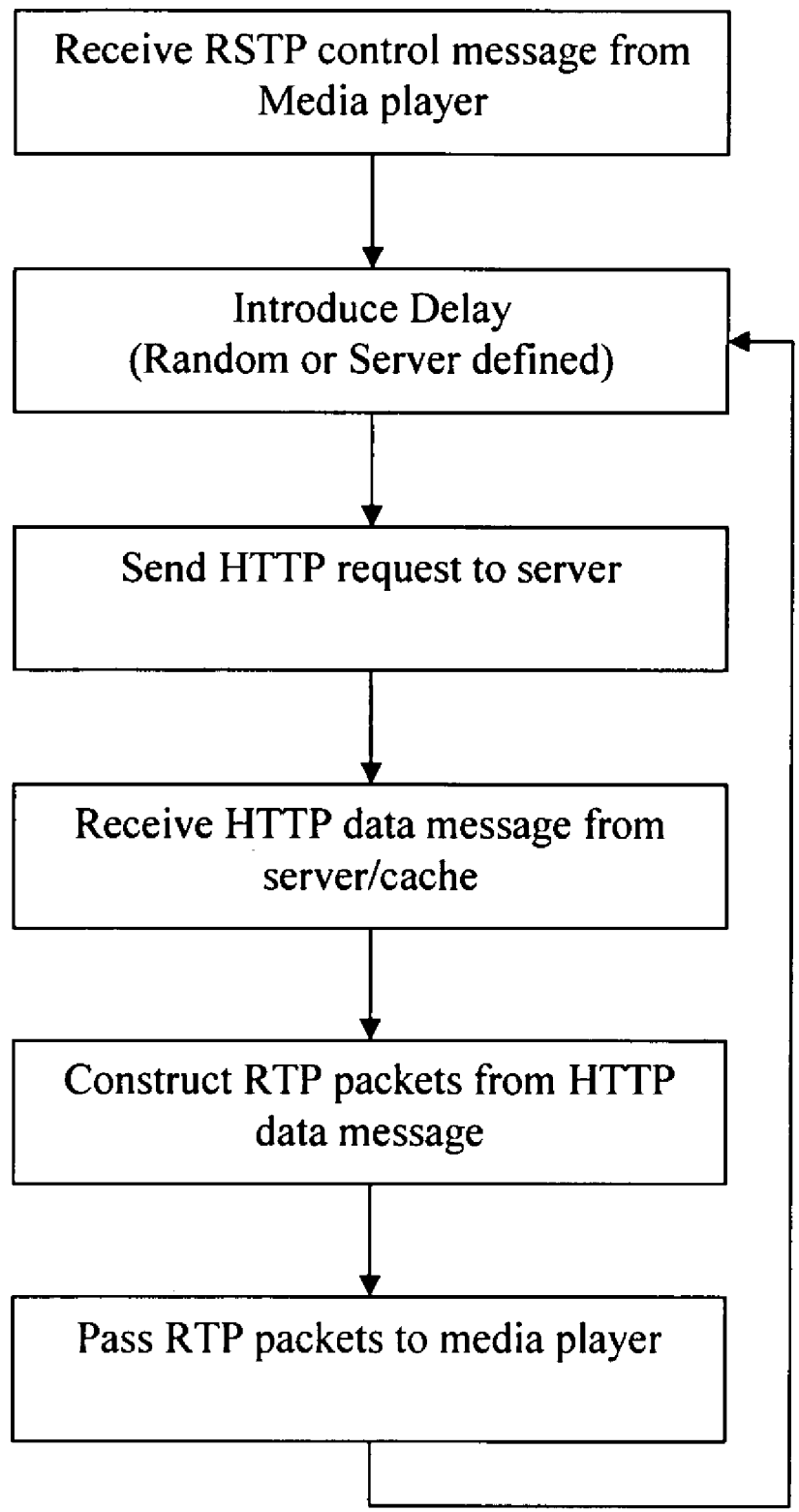
FIG. 5 is a functional flowchart for the Client application.
Figure 6:
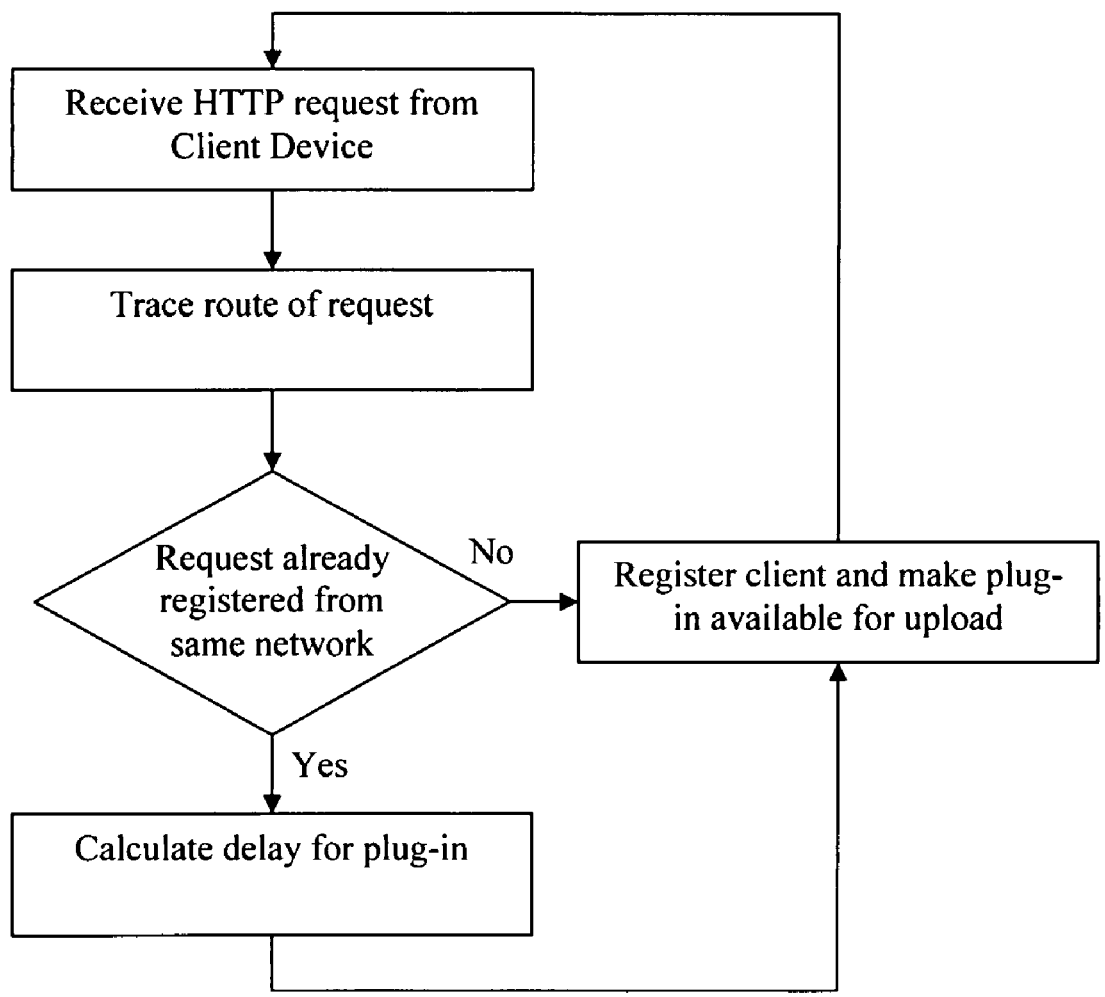
FIG. 6 is a functional flowchart for the server application: pre-registration step.
Figure 7:
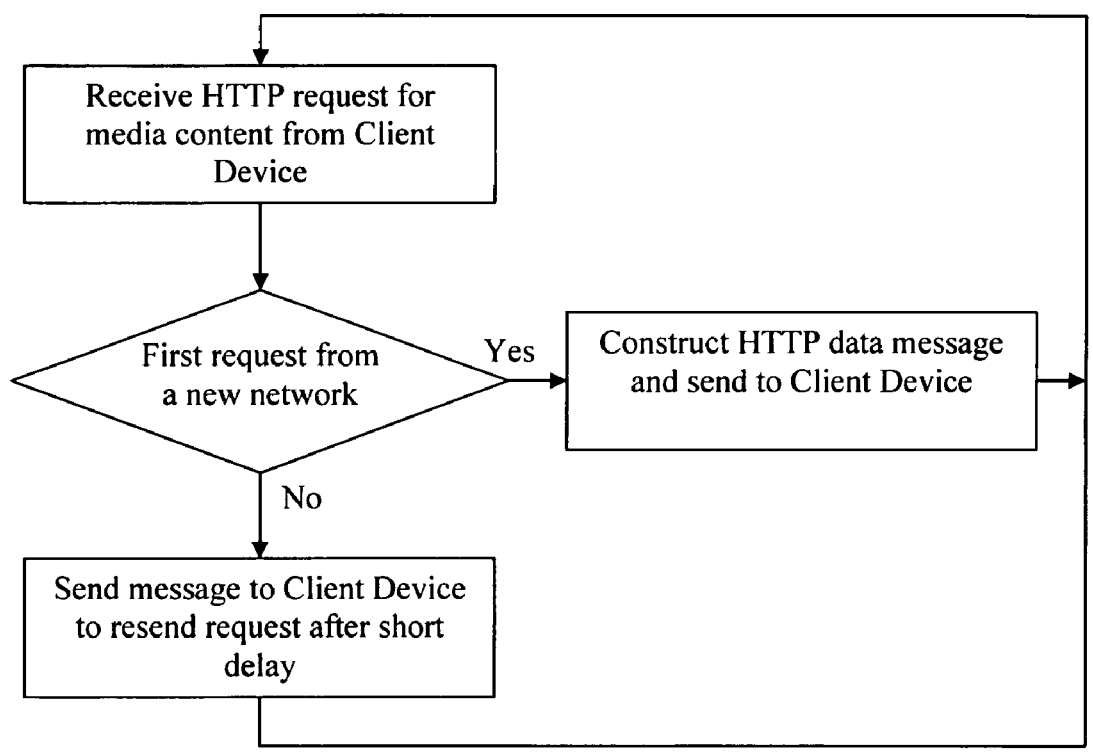
FIG. 7 is a functional flowchart for the server application: cacheable video streaming.

FIGS. 5 through 7 are functional flowcharts for the client and server applications in the client orientated solution. FIG. 5 is a functional flowchart of the client application. In the server orientated solution the client application does not need to perform the second step—introduce delay—of FIG. 5. FIGS. 6 and 7 are functional flowcharts for the server application pre-registration and streaming functions respectively.

In the above described embodiments the fixed delay is assigned by the server. The skilled addressee will appreciate that other methods of fixing a delay may be used. For example, the peer client applications may use a fixed delay after the peer leader (seed). There are also other ways to identify the seed within a group of peers. The skilled addressee will appreciate that there exist many leader-election schemes in computer science. For example, the server can assign a ranking of the peers when they first register for service and when the seed is gone the next highest ranked peer will become the seed, the seed can also be chosen by the server randomly or before the seed leaves or the server can broadcast to all the peers and ask them who want to be the next seed, the first one replies can be the new seed, etc.

Where in the above description reference has been made to integers or elements have known equivalents there such are included herein as if explicitly set forth. Further, an exemplary embodiment of the invention has been described in various preferences to illustrate and explain the invention. However, this is not intended to limited the scope of use of functionality of the invention and the skilled addressee with appreciate the invention has general application in providing data to two or more computers on the same network and in managing network traffic and data recourse requests generally.

What is claimed is:

1. A method for providing data to two client devices on a first network from a server on a second network, said first network including a shared cache for caching data requested by the client devices, the method comprising:

in response to a first request for the data being received at the server from a first one of the two client devices at a first point in time, serving the first client device with the requested data from the server such that the data is stored in the shared cache on the first network, in response to a second request for the data being received at the server from a second one of the two client devices at a second point in time, sending a message from the server to the second client device instructing the second client device to send a third request for the data after a delay, wherein the second point in time is before the first client device is served with the data such that the data is stored in the shared cache on the first network; and after the instructing, running on the second client device a program that interrupts the request for the data in the second client device and sends the request after a moment in time when the data is stored in the shared cache.

2. The method of claim 1 wherein the delay is a random delay.

3. The method of claim 1 wherein the delay is a fixed delay determined by the server device or one or more of the client devices.

4. A method for streaming media content to two client or more devices on a first network from a media server on a second network, said first network including a shared cache for caching data requested by the client devices, the method comprising:

sending from a first one of the two or more client devices to the media server a first request for streaming media content, the first request being sent at a first point in time, in response to the first request, serving the first client device with the requested media content from the media server such that the media content is stored in the shared cache, sending from a second one of the two or more client devices to the media server a second request for streaming media content, the second request being sent at a second point in time, the second point in time being later than the first point in time, and if the second request is received at the media server before the first client device is served with the media content, causing the second one of the two or more client devices to send a third request for the streaming media content at a third point in time after a delay comprising running on the second one of the two or more client devices a program that interrupts the request for the media content in the second one of the two or more client devices and sends the request after a moment in time when the media content is stored in the shared cache, wherein the third point in time is later than the second point in time such that the media content is served from the cache.

5. The method of claim 4 wherein serving the first client device with the requested media content comprises serving a segment of the requested media content as a cacheable web page.

6. The method of claim 4 wherein the first network comprises a local area network and the media server is on the Internet.

7. The method of claim 4 further comprising identifying an instance of requests for streaming media content being made to the media server by at least two client devices in the first network where the requested streaming media content has not been previously served to a client device in the first network and wherein identifying said instance comprises passing said requests to the media server and, in the media server, identifying that the requests originate from the same network.

8. The method of claim 4 further comprising identifying an instance of requests for streaming media content being made to the media server by at least two client devices in the first network where the requested streaming media content has not been previously served to a client device in the first network and wherein identifying said instance comprises, in the media server, pre-registering the first and second client devices, and during the pre-registering step, tracing the route of registration requests made from the first and the second client devices and thereby identifying the originating network.

9. The method of claim 4 further comprising providing on the first and second client devices software modules that direct requests for streaming media content directed to the media server, the software modules directing that the first client device requests the streaming media content at a first point in time, and directing that the second client devices requests the streaming media content at a second point in time, wherein the second point in time is later than the first point in time.

10. The method of claim 4 wherein the delay is a random delay.

11. The method of claim 4 wherein the delay is determined by the server.

12. The method of claim 4 wherein causing the second one of the two or more client devices to send the third request for the media content at the third point in time comprises sending a message from the server to the second client device instructing the second client device to resend the third request after the delay.

13. A method for providing data substantially simultaneously to two client devices connected to the same network, said network including a caching server for caching data requested by the client devices, the method comprising:

receiving a first request for data from a first client device on a network, receiving a second request for the data from a second client device on the network, serving the first client device with the requested data such that the content is cached by the caching server, sending a message to the second client device instructing the second client device to send another request for the data after a delay, thereby allowing the second client device to be served with the requested media content by the caching server; and after the instructing, running on the second client device a program that interrupts the another request for the data in the second client device and sends the another request after the delay and at a moment in time when the data is stored in the shared cache.

* * * * *